April 6, 1965

T. S. AMLIE ETAL 3,176,523

TWO AXIS RATE GYRO

Filed Nov. 8, 1962

INVENTORS.
THOMAS S. AMLIE
EARL J. DONALDSON

BY

*C. H. Fisht*

ATTORNEY.

April 6, 1965  T. S. AMLIE ETAL  3,176,523
TWO AXIS RATE GYRO
Filed Nov. 8, 1962  2 Sheets-Sheet 2
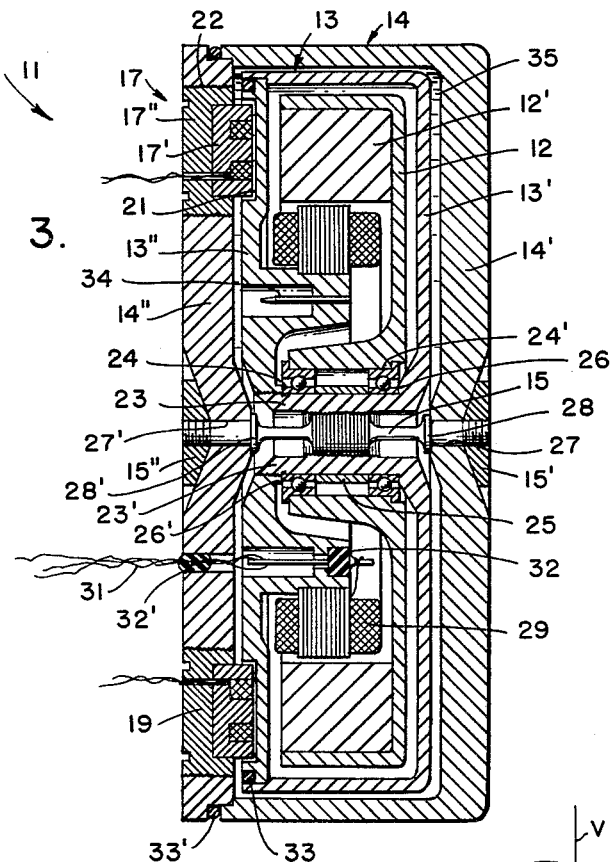
FIG. 3.
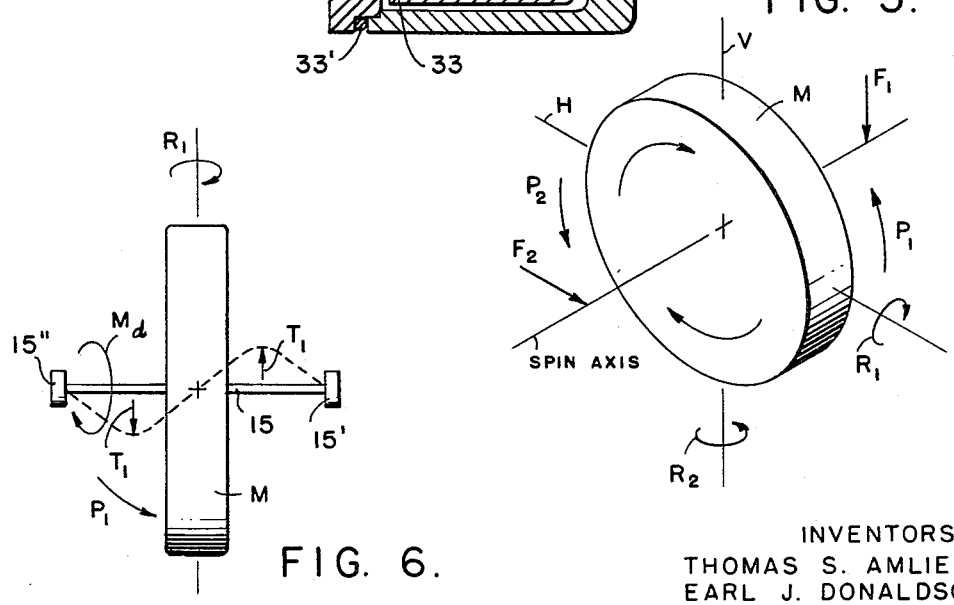
FIG. 5.
FIG. 6.
INVENTORS.
THOMAS S. AMLIE
EARL J. DONALDSON
BY
*P. H. Fisht*
ATTORNEY.

3,176,523
TWO AXIS RATE GYRO
Thomas S. Amlie and Earl J. Donaldson, China Lake, Calif., assignors to the United States of America as represented by the Secretary of the Navy
Filed Nov. 8, 1962, Ser. No. 236,464
6 Claims. (Cl. 74—5.6)
(Granted under Title 35, U.S. Code (1952), sec. 266)

The invention herein described may be manufactured and used by or for the Government of the United States of America for governmental purposes without the payment of any royalties thereon or therefor.

The present invention relates to angular rate measuring devices and more particularly to a gimbal-less two axis rate gyro which is used to measure angular displacement for telemetering pitch and yaw information in vehicle guidance systems.

In the field of vehicle guidance, wherein pitch and yaw damping is necessary for guided missiles, aircraft, underwater torpedoes, and the like, it has been the general practice to provide systems which utilize measuring devices requiring two separate single axis rate gyros. The gyroscopic mass or rotor of each gyro provides only small angular moments of inertia due to the necessary size restriction imposed through vehicle design parameters. The small moments of inertia of the known devices tend to render these devices highly sensitive to linear acceleration and drift. To avoid slowdown, for thereby maintaining angular momentum necessary for rendering the systems functionally operative, the spin motors of the known systems are continuously operated at high speeds of 24,000 or 36,000 r.p.m. (revolutions per minute). These continuous high speeds tend to shorten gyro rotor bearing life and thereby impose a short operative life on the given devices.

The general purpose of this invention is to provide a guidance device utilizing a single reliable and durable two axis rate gyro which accurately provides both pitch and yaw rate signals through a single gimbal-less gyro to attain the advantages attendant known plural gyro guidance devices while eliminating the aforementioned disadvantages.

Therefore, an object of this invention is to provide a system having a single gyro capable of supplying both pitch and yaw rate signals, which signals are also indicative of angular acceleration.

Another object is to provide a simple and economic gimbal-less two axis rate gyro having a simplified single rotor supporting shaft.

Yet another object is to provide a simplified and calibrated gyro caging device capable of imposing predetermined precession restraint.

A further object is to provide in a missile guidance device, a two axis rate gyro system which will produce both pitch and yaw rate signals from a single gyro.

Still another object is to provide a gimbal-less two axis rate gyro having a resonant frequency of suspension higher than the spin frequency in order to minimize system "cross-talk."

Other objects, advantages and novel features of the invention will become apparent from the following detailed description of the invention when considered in conjunction with the accompanying drawings wherein:

FIG. 3 is a sectional elevation of an assembled device taken generally along lines 3—3 of FIG. 1, but on an enlarged scale;

FIGS. 5 and 6 are diagrammatic views illustrating the operation of the device of the present invention.

Figure 1:
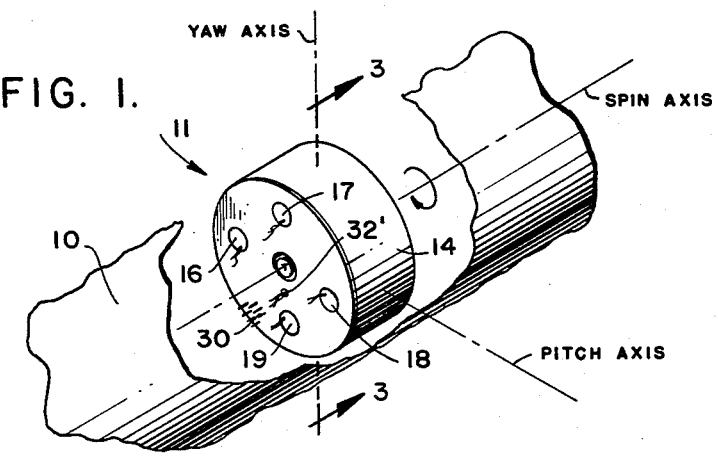
FIG. 1 is a schematic perspective view of an assembled and mounted device of the present invention.

Referring now to the drawings, wherein like reference characters designate like or corresponding parts throughout the several views, there is fragmentarily shown in FIG. 1 a guided vehicle, generally designated 10, which requires pitch and yaw damping. The vehicle 10 may be any one of several known guided vehicles which require pitch and yaw damping for guidance purposes. Disposed within the vehicle 10 is an assembled device comprising a two axis rate gyro, generally designated 11, arranged so that the spin axis thereof extends parallel a given line, or path of travel selected for the given vehicle.

Figure 2:
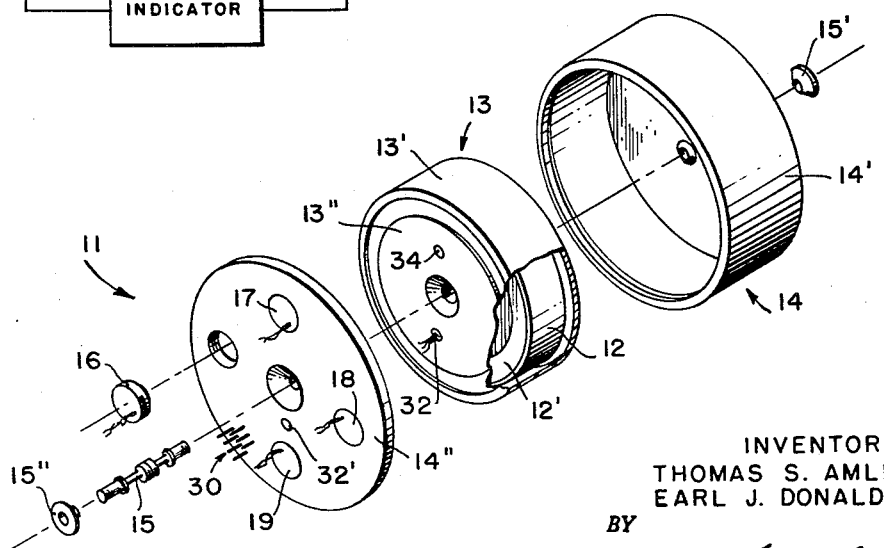
FIG. 2 is an exploded view of the device with parts broken away.

Turning now to FIG. 2, the two axis rate gyro 11 comprises a gyroscopic rotor 12 formed with a hollow ring-shaped soft iron rotor mass 12' secured thereto. The rotor 12 is disposed within an inner cell, generally designated 13, comprising a housing 13' and a cover plate 13". The inner cell 13 is, in turn, disposed within an outer cell, generally designated 14, comprising a housing 14' and a cover plate 14". A pre-calibrated steel flexure shaft 15, along with its mounting nuts 15' and 15", serves to mount the rotor 12 and inner cell 13 within the outer cell 14. The cell 13 is suspended by the shaft 15 in a spaced relationship with the outer cell components 14' and 14". Mounted on the outer cell cover plate 14" are four pick-off coils 16, 17, 18 and 19 comprising variable reluctance coils which serve to sense gyroscopic precession imparted to rotor 12, in a subsequently described manner, as angular rate is imposed on the device through pitch and/or yaw being imparted to the vehicle in which the gyro is mounted. In FIG. 2, only coil 16 is shown exploded from cover plate 14".

The four coils 16, 17, 18 and 19 are disposed on the cover plate 14" and are arranged at opposite sides of the center of the plate so as to be diametrically opposed forming two pairs of coils 16, 18 and 17, 19.

As each pair of the coils are of similar design and construction, a description of a single pair, formed of coils 17, 19, is deemed sufficient. It is to be noted, however, that each pair of coils function independently of the other pair, so that the signals rendered by a given pair are separately induced and are independent of the signals of the other pair.

Figure 4:
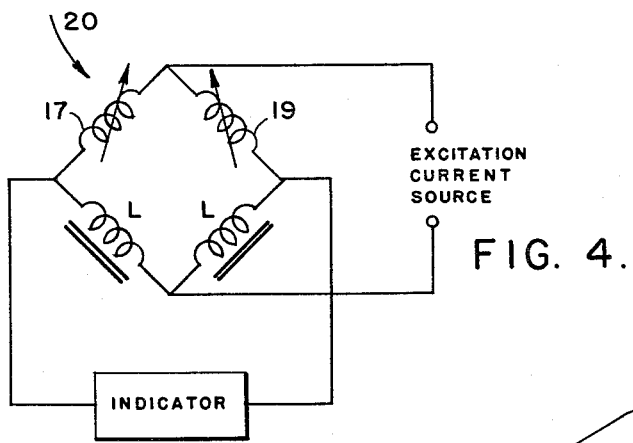
FIG. 4 is a schematic view illustrating a pick-off circuit utilized in the present invention.

As more clearly shown in FIG. 3, the pick-off coils 17, 19 are mounted on the cover plate 14" for adjustment relative to the cover plate 13" in which a coil accommodating channel 21 is formed. Each pick-off coil, as exemplified by coil 17, comprises a cup-core inductance coil member 17', secured to a threaded and slotted support member 17", by any suitable means such as an epoxy, for example. Support member 17" is provided with threads 22 which are in the order of 160 threads per inch and are provided so that the coil 17 may be mechanically adjusted with respect to cover plate 13" for electrically balancing the circuit through creating an air gap of a desired dimension between the coil member 17' and cover plate 13" in the area of the plate channel 21. The coils of each pair are arranged at opposite sides of the shaft 15 and are connected to an electrically balanced inductance bridge circuit 20, as illustrated in FIG. 4. The functions of inductance bridge circuits are well known, hence a specific description thereof is not deemed necessary for providing an understanding of the instant invention and, accordingly, is omitted in the interest of brevity.

The housing 13' of the inner cell 13 is provided with an integrally formed hollow spin shaft 23, FIG. 3, concentric with the gyroscopic spin axis of the rotor 12.

Along the spin shaft 23 there is arranged a pair of doubled-back preloaded bearing races 24 and 24', which are maintained in a spaced relation from each other by a spacer member 25. The pair of bearing races 24 and 24' are confined against the spacer member 25, along the spin shaft 23, by shoulder means 26 and 26', when cover plate 13" is secured relative to the spin shaft 23, by suitable means such as a threaded portion 23' provided on the spin shaft 23.

The bearing races 24 and 24' mount the rotor 12 and serve to confine the rotor against linear displacement, while supporting it for rotational or angular displacement about the spin shaft 23 in such a manner that significant displacement, other than desired rotational displacement, is substantially eliminated.

Threaded longitudinally through the spin shaft 23 is the steel flexure shaft 15. The flexure shaft 15 is of such size and has an elastic modulus such that its deflection may be predicted when the shaft is subjected to a known bending load. It is understood that the design of shaft 15, and the material utilized to impart the desired elastic characteristic thereto, constitutes a pre-calibration of the shaft, whereby a predetermined restraint is developed by the shaft upon a given deflection thereof. However, it is further understood that shaft 15 is designed to provide a high resonant frequency of suspension, which frequency is maintained higher than the gyroscopic spin frequency in order to reduce "cross-talk," viz. the tendency of the mass to precess toward both pairs of pick-off coils simultaneously, to thereby generate signals indicating a rate about both the yaw and pitch axis, while in reality, rate is actually occurring about a single one of the axes. A frequency relationship between the resonant and the gyroscopic spin frequencies of 135/100 cycles per second has been found satisfactory for reducing undesired "cross-talk."

The flexure shaft 15, having the cell 13 secured thereto, as aforedescribed, is mounted with its opposite ends extending through apertures 27 and 27' provided in outer cell housing and cover plate 14' and 14", respectively. Shoulders means 28 and 28' are provided on shaft 15 for co-operating with nuts 15' and 15" in order to properly secure the ends of the shaft, and for orienting and maintaining the inner cell 13 in a predetermined disposition relative to the outer cell housing 14' and cover plate 14", so that relative displacement between the two cells is limited to displacement achieved through a bending of shaft 15.

For effecting a rotation of the rotor 12 about its spin axis, a wound stator 29 is supported by cover plate 13" and arranged within cell 13 and extends inside the ring-shaped mass 12', FIG. 3, to provide a drive means for the rotor. The winding of the stator 29 is connected with an external power source through suitable connections, such as a plurality of terminals 30, FIG. 2. The winding is provided with electrical leads 31, which extend through lead openings in the cover plates 13" and 14" to the terminals 30. A pair of cover plate lead opening seals 32 and 32' are provided so that as the leads 31 extend through the respective cover plates a sealed condition is established and maintained within the cells 13 and 14.

The operative speed of the mass is determined by various design parameters, and speeds as low as 6000 r.p.m. (revolutions per minute) have been found satisfactory for missile guidance, however, substantial quantities of heat are generated within the cell 13. Therefore, an inert atmosphere may be provided within cell 13 for the conduction of friction heat away from the friction surfaces. Such an atmosphere may be established by first evacuating the sealed cell 13 through a tube 34, which passes through cover plate 13", and then introducing an inert gas through the tube into the cell and thereafter sealing the tube. Helium has been found quite satisfactory for this heat conducting function, and provides minimum resistance to rotation of the rotor 12.

As the device of the instant invention may be subjected to vibrations, when mounted in an operative vehicle, a silicone oil bath 35 is provided within cell 13 for surrounding cell 13 to render a damping effect for undesired vibrations imposed on the gyro.

In order that an understanding of the operation of the hereinabove described device may be enhanced, there is shown in FIG. 5 a gyroscopic mass M spinning, as indicated by directional arrows, about a horizontal spin axis. For purposes of illustration, it may be assume that a downwardly directed torque or pitch inducing force $F_1$ is applied downwardly so as to tilt the spin axis causing an angular rate $R_1$ about a horizontal axis H. As a result of the induced rate $R_1$, the spinning mass M will be subjected to gyroscopic precession which tends to rotate the mass M about a vertical axis V, and 90° to the direction of the applied force $F_1$, in the direction as indicated by directional arrow $P_1$. Application of a horizontally directed torque or yaw inducing force $F_2$ causes the occurrence of a similar result, as indicated by arrows $R_2$ and $P_2$, by causing precession to occur about the horizontal axis H when angular rate occurs about the vertical axis V.

Turning now to FIG. 6, it is assumed that the flexure shaft 15 extends through the mass M, which is rotating in the direction indicated by arrow $M_d$. Precession, indicated by arrow $P_1$, generated in a manner as hereinbefore described, creates a shaft bending torque causing the flexure shaft 15 to bend, as illustrated in exaggerated manner by dotted lines, in the directions indicated by arrows $T_1$. The shaft continues to bend until the bending or deflection resisting force of the shaft equals the torque created by precession. The magnitude of the precession of the mass may be determined in order to indicate the magnitude of induced rate $R_1$.

Therefore, it is understood that the gyroscopic device 11 is so mounted in a vehicle 10 that the spin axis of the gyroscopic mass extends generally along the direction of travel of the vehicle. The power supply for the rotor drive means is remotely disposed and is connected with the stator 29 of the rotor drive means through lead 31. When the motor lead 31 is energized, the stator 29 becomes energized and causes the gyroscopic rotor to spin about its spin axis and come up to an operative speed, for example, 6000 revolutions per minute. This spinning of the rotor mass 12' about its spin axis imparts a quality of angular momentum to the inner cell 13. As the vehicle 10, and consequently the device 11, is pivoted about a given axis, corresponding to the yaw or pitch, the mass 12', and therefore inner cell 13, is caused to precess thereby generating an attendant torque. The precession generated torque serves to deflect, or bend the pre-calibrated flexure shaft 15 until the precession resisting torque of the shaft is equal to the precession generated torque of the mass. The cell 13 is thus caused to move, under the influence of rotor mass precession, in a pivoting manner about a given axis to alter the air gaps between a pair of adjacent inductance pick-off coils and the cell by diminishing the air gap at one side of the precession axis while simultaneously increasing the air gap at the opposite side. The bridge circuit 20 is then utilized to detect changes in coil inductance, caused through the variance of the air gaps, to determine the magnitude of precession imparted to cell 13 and to provide an indication thereof. The amplitude of the precession may thus be determined and, accordingly, the angular rate being imposed on the device be established. It is noted that angular acceleration of the vehicle may be determined through relating the precession of the cell to the time necessary to effect the precession.

Thus there has been provided a simple and economic gimbal-less gyroscopic device for mounting in guided missiles and the like, which device is capable of indicating angular rate about both pitch and yaw axes, while utilizing only a single gyroscopic mass mounted for rotation about a flexible shaft. The rotation of the mass may be induced through an external power source which brings the rotation of the mass up to an operative speed for imparting angular moments of inertia of desired magnitude which endure for the time period during which the missile is to be under guidance control. The rotating mass is supported in such a manner that gyroscope caging may be readily controlled in a simplified manner and rotor bearing life and consequently the life of the device is substantially extended.

Obviously many modifications and variations of the present invention are possible in the light of the above teachings. It is therefore to be understood that within the scope of the appended claims the invention may be practiced otherwise than as specifically described.

What is claimed is:

1. A two axis rate gyro device comprising:
   a rotor mass having a spin axis;
   an elongated flexure shaft having a given resonant frequency of suspension for supporting said rotor mass at said spin axis;
   means defining a raised and elongated coupling segment formed about the central portion of said flexure shaft;
   a tubular spin shaft fixed to said coupling segment in a concentric relationship therewith;
   a plurality of mutually-spaced bearing means fixed about the exterior surface of said tubular spin shaft adapted to support said roto mass for gyroscopic rotation relative to said segment; and
   shaft support means disposed at opposite ends of the flexure shaft for supporting said flexure shaft at its opposite ends for thereby supporting said rotor mass in suspension therebetween, whereby rotation of said rotor mass about said spin axis may serve to impart rigidity to said rotor mass so that angular rate imposed on the rotor mass through the flexure shaft may cause the rotor mass to precess and deflect said flexure shaft in a predetermined manner.

2. The device as defined in claim 1, further characterized in that the flexure shaft comprises a pre-calibrated restraining shaft having a predetermined modulus of elasticity, whereby the shaft may exhibit a predetermined precession amplitude limiting characteristic and the amplitude of precession may serve to indicate angular rate and angular acceleration as the restraining shaft is deflected.

3. The device as defined in claim 2, further comprising: means including at least one pair of pick-off coils arranged adjacent said rotor mass and a bridge circuit connected with said coils for indicating precession amplitude.

4. A two axis rate gyro comprising:
   a rotor mass having a spin axis;
   an elongated and end-supported flexure shaft disposed along the spin axis of the rotor mass and having an elongated, concentrically arranged central segment supported in suspension by the shaft's endmost portions;
   bearing means including a spin shaft supported by said central segment and fixed relative thereto for supporting said rotor mass along said spin axis for rotation about said flexure shaft;
   a rotor mass confining inner cell mounted on said spin shaft;
   a rotor drive means arranged within said inner cell adjacent said rotor mass;
   an outer cell within which said inner cell is disposed in a spaced relationship therewith; and
   pick-off means adjustably mounted on said outer cell to indicate induced precession of said inner cell effected through a flexing of said flexure shaft and induced by an angular rate imposed on said rotor mass as it is caused to rotate by said drive means on said spin shaft about said flexure shaft.

5. A two axis rate gyro device comprising:
   a rotor mass having a spin axis;
   a flexure shaft disposed along the spin axis of the rotor mass;
   bearing means including a spin shaft supporting said rotor mass along said spin axis for accommodating rotation of said rotor mass about said flexure shaft;
   a hermetically sealed, rotor mass confining inner cell mounted on said spin shaft;
   a rotor drive means arranged within said inner cell;
   an inert cooling gas disposed within said inner cell;
   a hermetically sealed outer cell within which said inner cell is disposed in a spaced relationship therewith;
   a silicone damping fluid disposed within said outer cell; and
   pick-off means adjustably mounted on said outer cell to indicate induced precession of said inner cell effected through a flexing of said flexure shaft and induced by an angular rate imposed on said rotor mass as it is caused to rotate by said drive means on said spin shaft about said flexure shaft.

6. A two axis rate gyro device comprising:
   a rotor mass having a spin axis;
   a flexure shaft disposed along the spin axis of the rotor mass;
   bearing means including a spin shaft rigidly fixed to said flexure shaft for supporting said rotor mass along said spin axis for rotation about said flexure shaft;
   a rotor confining inner cell mounted on an fixed to said spin shaft so that inner cell precession occurs under the influence of rotor mass precession, and is limited by said flexure shaft;
   a rotor drive means arranged within said inner cell adjacent said rotor mass;
   an outer cell within which said inner cell is disposed in a spaced relationship therewith; and
   pick-off means adjustably mounted on said outer cell to indicate induced precession of said inner cell effected through a flexing of said flexure shaft and induced by an angular rate imposed on said rotor mass as it is caused to rotate by said drive means on said spin shaft about said flexure shaft.

References Cited by the Examiner
UNITED STATES PATENTS
2,852,943    9/58    Sedgfield _____ 74—5.6 XR BROUGHTON G. DURHAM, *Primary Examiner.*